No. 861,098. PATENTED JULY 23, 1907.
I. ELLWOOD.
LAWN MOWER.
APPLICATION FILED JULY 3, 1906.
3 SHEETS—SHEET 3.
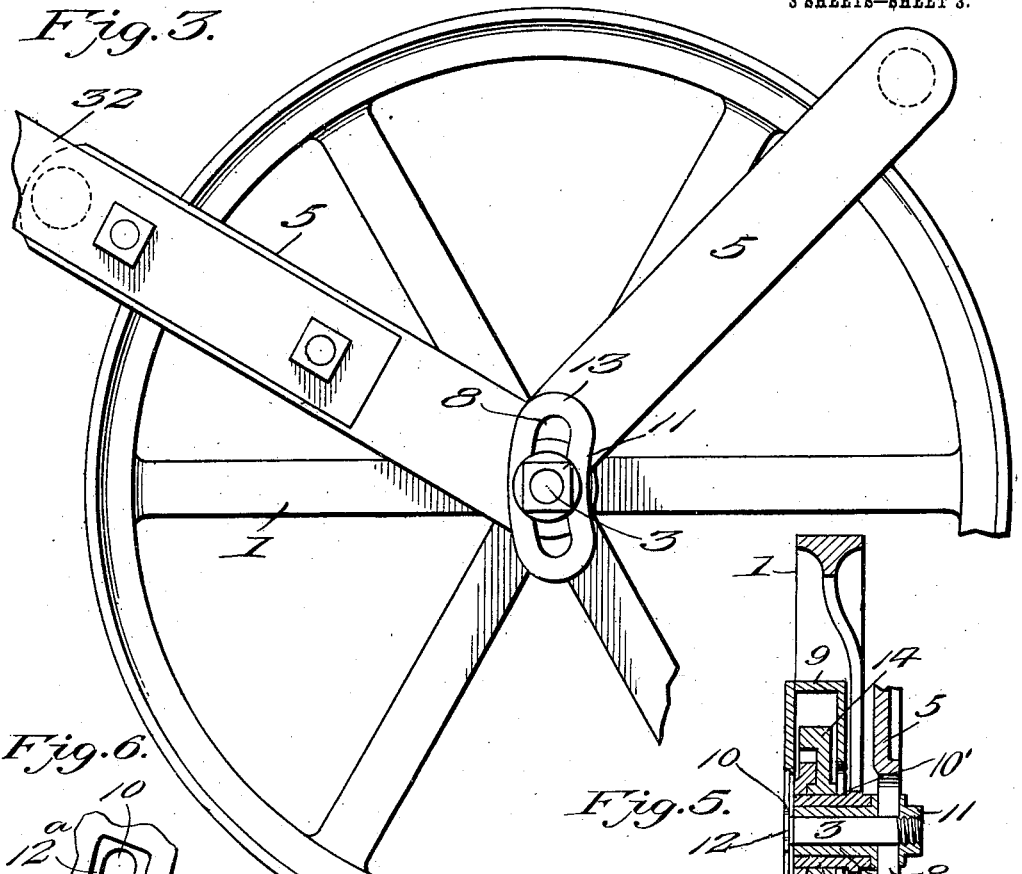
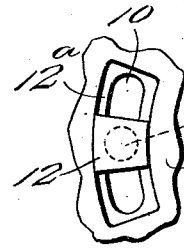
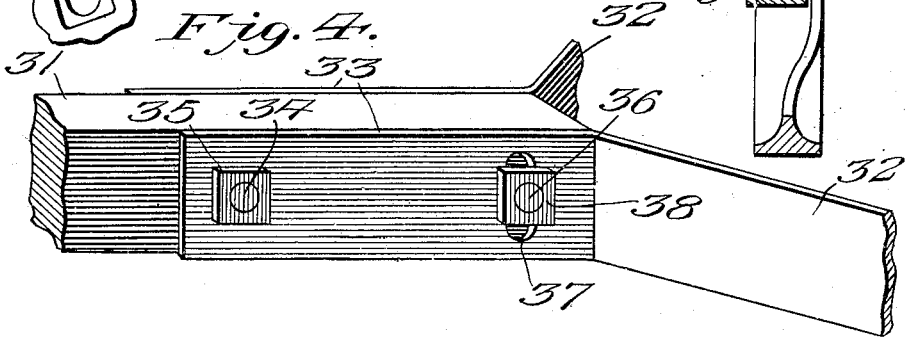
Witnesses
Edwin G. McKee
C. C. Hines
Inventor
Ivan Ellwood
By Victor J. Evans.
Attorney

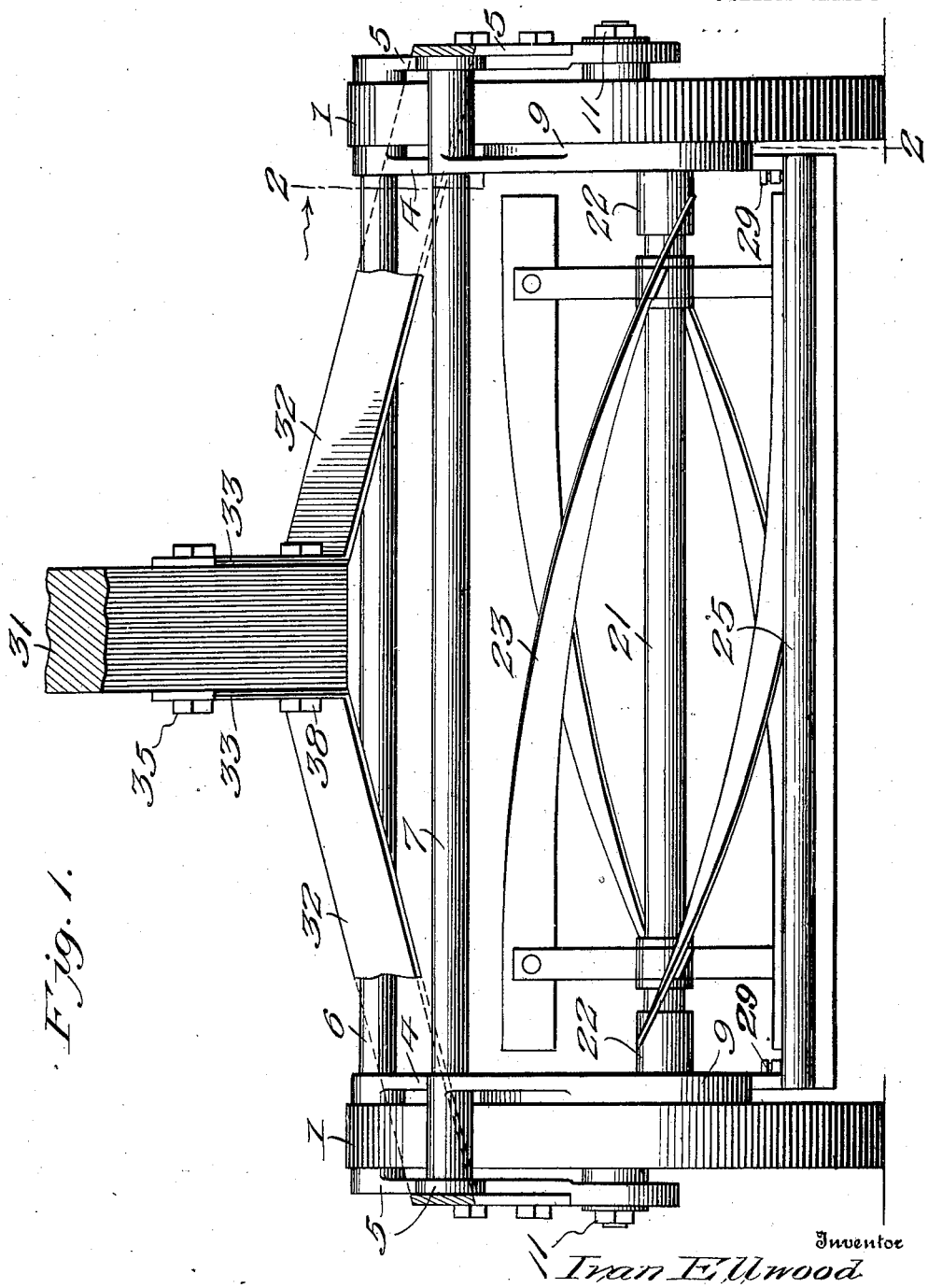

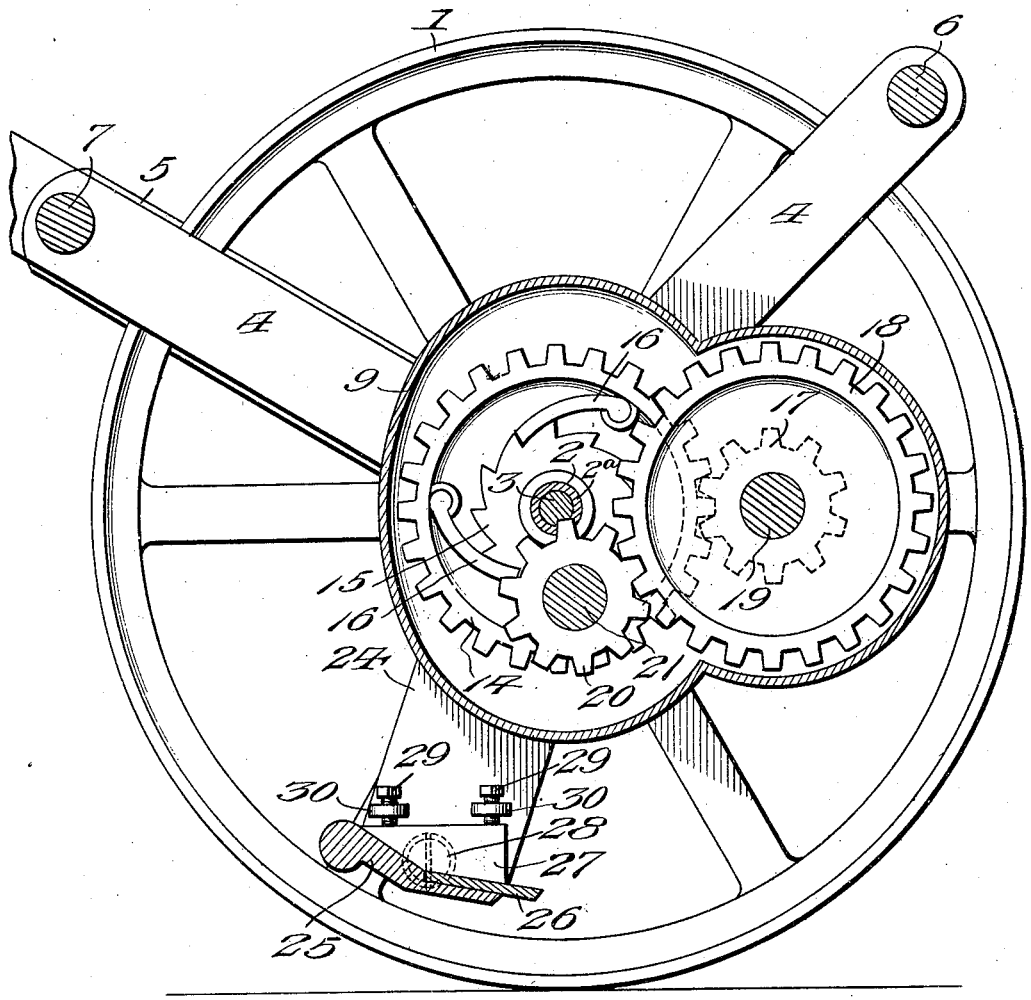

UNITED STATES PATENT OFFICE.

IVAN ELLWOOD, OF RED OAK, IOWA.

LAWN-MOWER.

No. 861,098.             Specification of Letters Patent.             Patented July 23, 1907.

Application filed July 3, 1906. Serial No. 324,666.

*To all whom it may concern:*

Be it known that I, IVAN ELLWOOD, a citizen of the United States of America, residing at Red Oak, in the county of Montgomery and State of Iowa, have invented new and useful Improvements in Lawn-Mowers, of which the following is a specification.

This invention relates to improvements in lawn-mowers of that type employing a rotary cutter having a series of spiral cutting knives and operating in conjunction with a fixed cutting knife carried by a frame mounted on ground wheels.

The object of the invention is to provide a novel construction of frame and means for mounting the same and rotary cutting wheel upon the drive or ground wheels, whereby the necessity of employing a ground roller is obviated, and whereby the cutting wheel is hung between the drive wheels in such a position that the fixed knife has its cutting edge lying substantially in the vertical plane of the axis of the drive wheels or nearly so when the machine is in operation, the entire weight of the machine being carried upon the drive wheels to secure greater tractive and cutting power.

Another object is to provide improved means for adjusting the frame and cutting mechanism on the drive wheels to regulate the height of the cut and to position the stationary cutter so that it may swing under the action of the handle in the operation of the machine in a given range of movement without altering its relation to the knives of the cutting wheel.

In the accompanying drawings,—Figure 1 is a rear elevation of a lawn mower embodying my invention, parts being broken away to better show the construction. Fig. 2 is an irregular section taken on the line 2—2 of Fig. 1. Fig. 3 is an end elevation showing one of the ground wheels and the associated outer hanger of the frame, together with the adjustable connection between said hanger and the pivot bolt of the ground wheel. Fig. 4 is a detail showing the adjustable connection of the handle with its yoke. Fig. 5 is a central vertical section through one of the ground wheels and the associated gearing. Fig. 6 is a detail looking toward the inner side of the gear casing.

Referring to the drawings, 1 represents ground or drive wheels of the mower, each having a hub 2 provided with a bearing box or bushing sleeve 2ª through which extends an axle bolt 3. The axle bolts 3 are adjustably mounted in the sides of the supporting frame, which embodies inner and outer hangers composed of sets or pairs of divergently arranged arms 4 and 5. The front and rear arms of the hangers at both sides of the machine are connected and braced by transverse rods or bars 6 and 7 formed integrally therewith or secured thereto in any preferred manner. The converging ends of the outer hanger arms 5 are connected at their point of junction and provided with an arcuate guide slot 8, while upon the inner arms is formed or secured a gear casing 9, closed at its inner side by a removable cover plate 9ª, said cover plate and outer face or side wall of the casing being respectively provided with arcuate guide slots 10 and 10' similar in form and arrangement to the guide slot 8. The hub 2 carrying the sleeve 2ª is free from connection with the frame and casing and slides in the slot 10', which is sufficiently wide for the purpose, so that said hub will not interfere with the adjustment of the frame, and the bolt 3 extends through the sleeve and the slots 8 and 10, being slidable in said slots, whereby the frame as a whole is adapted to be vertically adjusted in an arcuate path on the ground wheels. The outer end of the bolt carries a clamping nut 11 which engages a boss 13 formed around the slot 8, and is provided at its inner end with an angular head 12 fitting and sliding in a recess 12ª formed in the plate 9ª about the slot 10. The head 12 is thus countersunk in the cover plate of the gear casing and bears against the side walls of the recess to hold the bolt from rotation. As shown, the sleeve 2ª is adjustable with the bolt, whereby the frame of the machine may be adjusted, as hereinafter described, on the ground wheels to regulate the height of cut.

Within each gear casing 9 is arranged a master drive wheel 14 loosely fitted on the hub 2 on the outer side of a ratchet wheel 15 fixed to said hub, the wheel 14 being provided with gravity pawls 16 adapted to engage the teeth of the ratchet wheel, the construction and arrangement of the pawls and teeth being such as to adapt the ratchet wheel to impart motion to the master drive wheel when the machine is propelled forward and allow the pawls to ride over the teeth without affecting said master drive gear to permit the machine to be backed or drawn rearwardly without operating the cutting mechanism. The gear 14 meshes with a pinion 17 formed integrally with a larger power transmitting gear 18 journaled on a shaft 19 carried by the casing, the gear 18 meshing with a pinion 20 on the adjacent end of the shaft 21 of the rotary cutter, which shaft is journaled at its ends in bearings 22 carried by the respective casings and is provided with spiral cutting blades 23 suitably mounted thereon, as clearly shown in Fig. 1, said shaft and blades forming the rotary cutter.

Projecting downward from each casing 9 is a hanger arm 24, the two arms 24 carrying the ledger or supporting plate 25 of the stationary cutting knife 26. The ledger plate 25 has at each end an extension or upright bracket piece 27 fulcrumed to the adjacent hanger arm 24 by a screw 28 or other suitable pivot connection, and to these bracket pieces are connected adjusting screws 29 mounted in bearings 30 carried by the hanger arm 24, whereby the stationary cutting knife may be adjusted on its pivotal connections to set it in proper relation to the cutting wheel.

The handle 31 of the machine is connected in the usual manner to the frame by a yoke, the arms 32 of which are connected at their forward ends with the rear arms of the outer hangers in a rigid manner, either by fastening them securely to said arms or forming them integrally therewith. The rear ends of the yoke arms terminate in parallel portions 33 receiving the forward end of the handle 31 which is pivotally connected therewith by a bolt 34 having the usual clamping nut 35. The bolt 34 is located a short distance in rear of the forward extremity of the handle, through which forward extremity extends a bolt 36 adjustable in arcuate slots 37 formed in the portions 33 and carrying a clamping nut 38 for fastening it in adjusted position. By this construction the handle may be adjusted to lie at any angle relative to the frame to the necessary degree without varying the position of the frame or parts of the cutting mechanism.

It will be seen from the foregoing description that the frame and cutting mechanism are hung directly from the drive wheels and are adjustable bodily thereon through the movement of the bolts 3 in the slots 8 and 10 to move the cutters closer to or farther from the ground surface to regulate the height of the cut, and that the arc of adjustment is such that the gears 14 and 17 will always be properly engaged, whatever the adjustment of the height of the frame with reference to the drive wheels, and further that the mode of constructing the frame insures great strength, rigidity and durability. The ledger plate 25 is so hung relative to the axis of the drive wheels that the stationary knife 26 has its cutting edge lying in the vertical plane of said axis or nearly so when in operation. In practice, it is preferred to set the parts so that the distance of said stationary knife from the axle of the ground wheels relative to the length of the handle is approximately on a ratio of one to twelve, the handle being about forty-eight inches from the center of the drive wheel and the stationary knife about four inches in a machine of ordinary size, so that a variation of as much as a foot in the distance of the handle from the ground while the machine is in operation will cause the knife to move but an inch in the arc of a circle concentric with the axis of the drive wheels, enabling the handle to be manipulated in operation without changing the position of the stationary cutting knife to any material extent, the variation being so slight in the adjustment and height of cut as to be practically imperceptible. Accordingly, the necessity of employing the usual ground roller as a secondary support and to regulate the height of cut is obviated.

It will further be observed that as the weight of the frame and drive gearing is supported solely by the drive wheels, the tractive and driving power of the latter is increased to a maximum extent. The construction which enables the usual ground roller to be dispensed with also simplifies and lightens the machine, thus adapting it to be manufactured at a lower cost.

Having thus described the invention, what is claimed as new, is:—

1. A lawn mower comprising a frame including side pieces, gear casings supported by the side pieces, the casings and side pieces being provided with vertically arranged arcuate slots, a stationary cutter carried by the casings, a rotary cutter having its shaft journaled at its ends in the gear casings, axle bolts projecting through the slots in the side pieces and gear casings, ground wheels journaled on the axle bolts, one of said wheels being provided with a hub extending into the adjacent casing, gearing in said casing driven from the hub to operate the rotary cutter, the frame with the cutting mechanism as a whole being adjustable on the ground wheels through the medium of said arcuate slots and axle bolts, and means cooperating with the bolts for fixing the parts in adjusted position.

2. A lawn mower comprising a frame including side pieces, each comprising inner and outer bracket arms, the outer bracket arms being provided with vertically arranged arcuate slots, gear casings supported by the inner bracket arms and provided in their inner and outer side walls with corresponding arcuate slots, a stationary cutter carried by the casings, a rotary cutter having its shaft journaled at its ends in the gear casings, axle bolts projecting through the slots in the outer bracket arms and gear casings, a ground wheel arranged between the inner and outer bracket arms at each side of the frame and journaled on the axle bolts, one of said wheels being provided with a hub extending into the adjacent casing through the slot in the outer wall thereof, gearing in said casing driven from the hub to operate the rotary cutter, the frame with the cutting mechanism as a whole being thereby adjustable on the ground wheels through the medium of said arcuate slots and axle bolts, and nuts upon the outer ends of the axle bolts and engaging the outer brackets to clamp the gear casings and frame in adjusted position.

3. A lawn mower comprising a frame including side pieces, gear casings supported by the side pieces, said side pieces and casings being provided with arcuate slots, a stationary cutter carried by the casings, axle bolts adjustably connected with the frame pieces and projecting through the slots in the gear casings, ground wheels journaled on the axle bolts, one of said wheels having a hub projecting into the adjacent casing through the slot in the outer wall thereof, a rotary cutter having its shaft journaled at its ends in the gear casings, gearing in one of said casings driven by the hub, and means for securing the gear casings and frame in adjusted position on the axle bolts.

4. A lawn mower comprising a frame including side pieces, each embodying inner and outer bracket arms, the outer bracket arms being provided with vertically arranged arcuate slots, gear casings integral with the inner bracket arms and provided in their inner and outer walls with corresponding slots, a stationary cutter supported from the gear casings, axle bolts projecting through the slots in the gear casings and outer bracket arms, ground wheels arranged between the inner and outer bracket arms and journaled on the axle bolts, one of said wheels being provided with a hub extending into the adjacent casing through the slot in the outer wall thereof, a rotary cutter having its shaft journaled at its ends in the gear casings, a train of gearing in the casing in which said hub projects connecting the hub with the cutter shaft and provided with clutch mechanism, and clamping means associated with the bolts for fixing the frame in any of its adjusted positions relative to the ground wheels.

5. A lawn mower comprising a frame including side pieces, gear casings supported by said side pieces, said side pieces and casings being provided with arcuate slots, axle bolts extending through said slots, a stationary cutter suptransmission gear driven by the pinion, and a pinion upon ported by the casings, a rotary cutter having its axle journaled at its ends in the gear casings, ground wheels, one having a hub extending through one of said slots into the adjacent gear casing, said wheels being journaled upon the axle bolts, means associated with the bolts for clamping the frame in adjusted position relative to the ground wheels, a ratchet wheel carried by the hub, a drive gear loose on said hub and provided with pawls engaging the ratchet wheel, a pinion meshing with the drive gear, a the rotary cutter shaft meshing with the transmission gear, all of said gears being inclosed in the casing receiving the hub carrying the ratchet wheel.

In testimony whereof, I affix my signature in presence of two witnesses.

IVAN ELLWOOD.

Witnesses:
F. A. VETTER,
N. A. WALLIN.